(12) United States Patent
Hendrickson et al.

(10) Patent No.: US 7,610,825 B2
(45) Date of Patent: Nov. 3, 2009

(54) MULTI-SPEED TRANSMISSION WITH COUNTERSHAFT GEARING

(75) Inventors: James D. Hendrickson, Belleville, MI (US); Tejinder Singh, Canton, MI (US); Henryk Sowul, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 268 days.

(21) Appl. No.: 11/678,051

(22) Filed: Feb. 22, 2007

(65) Prior Publication Data

US 2008/0202266 A1 Aug. 28, 2008

(51) Int. Cl.
*F16H 3/093* (2006.01)
(52) U.S. Cl. .......................... 74/330; 74/340
(58) Field of Classification Search .......... 74/325, 74/329, 330, 331, 340
See application file for complete search history.

(56) References Cited

U.S. PATENT DOCUMENTS

| | | | |
|---|---|---|---|
| 2005/0103140 A1* | 5/2005 | Gumpoltsberger | 74/329 |
| 2006/0174722 A1* | 8/2006 | Terai | 74/325 |
| 2006/0266141 A1* | 11/2006 | Ogami | 74/325 |

* cited by examiner

*Primary Examiner*—Charles A Marmor
*Assistant Examiner*—Edwin A Young (57) ABSTRACT

A transmission is provided having a dual clutch, to achieve torque flow through a countershaft gearing arrangement. The countershaft gearing arrangement includes a plurality of coplanar gear sets having gears that are selectively connectable to a plurality of countershafts. At least one transfer gear set transfers torque from the counter shafts to an output shaft. The output shaft is connected to a final drive unit that has a final drive unit output shaft that is transverse to an input member connected at one end to a torque converter and at the other end to the dual clutch.

34 Claims, 5 Drawing Sheets

MULTI-SPEED TRANSMISSION WITH COUNTERSHAFT GEARING

TECHNICAL FIELD

The invention relates to a multi-speed transmission having a countershaft gearing arrangement.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

SUMMARY

In an aspect of the present invention a powertrain having a transmission input member, a power source for generating a torque in the input member, a first intermediate shaft, a second intermediate shaft concentric with the first intermediate shaft, a clutch, first and second countershafts, a first and second set of gears, an output shaft and a first transfer gear is provided. The clutch is selectively engagable to couple the transmission input member with one of the first and second intermediate shafts. The first set of gears are connected for common rotation with the first intermediate shaft and intermesh with a first selectable set of gears to form a first plurality of co-planar gear sets, wherein each of the gears of the first selectable set of gears is connectable for common rotation with one of the first and second countershafts for selectively transferring the torque to the countershafts when the clutch is engaged. The second set of gears is connected for common rotation with the second intermediate shaft and intermesh with a second selectable set of gears to form a second plurality of co-planar gear sets, wherein each of the gears of the second selectable set of gears is connectable for common rotation with one of the first and second countershafts for selectively transferring the torque to one of the countershafts when the clutch is engaged. The output shaft is disposed radially outward of the second intermediate shaft. The first transfer gear is coupled to one of the first and second countershafts for transferring torque from the countershaft to the output shaft. Moreover, one of the first plurality of co-planar gear sets that produces a first and third gear ratio is adjacent the rear wall of the transmission housing.

In another aspect of the present invention, the first set of gears further includes two gears.

In another aspect of the present invention, the second set of gears further comprises three gears.

In another aspect of the present invention, the powertrain further includes a first idler gear rotatable about a first idler axis and intermeshing with at least one of the selectable sets of gears of the first set of gears.

In another aspect of the present invention, the powertrain further includes a second idler gear rotatable about the idler axis and intermeshing with at least one of the selectable sets of gears of the first set of gears.

In another aspect of the present invention, the powertrain further includes a second transfer gear connected for common rotation with one of the first and second countershafts and intermeshing with an output gear connected for common rotation with the output shaft for transferring torque from the countershaft to the output shaft.

In another aspect of the present invention, the powertrain further includes a plurality of synchronizers for selectively connecting the first and second set of selectable sets of gears to at least one of the countershafts.

In another aspect of the present invention, the powertrain further includes a final drive unit wherein the final drive unit has an output shaft that is perpendicular to the input member.

In another aspect of the present invention, the clutch is a dual clutch having a first hub connected to the first intermediate shaft and a second hub connected to the second intermediate shaft.

In another aspect of the present invention, the clutch is disposed between the first and second plurality of co-planar gear sets.

In another aspect of the present invention, the powertrain further includes a second clutch for selectively connecting at least one of the first and second selectable set of gears to at least one of the countershafts.

In another aspect of the present invention, the one of the second plurality of co-planar gear sets that transfers the torque to achieve the first forward gear ratio is disposed adjacent a structural wall of the housing of the powertrain.

In another aspect of the present invention, the one of the second plurality of co-planar gear sets that transfers the torque to achieve the seventh forward gear ratio is disposed adjacent a structural wall of the housing of the powertrain.

The above features and advantages and other features and advantages of the present invention are readily apparent from the following detailed description of the best modes for carrying out the invention when taken in connection with the accompanying drawings.

DESCRIPTION

Figure 1:
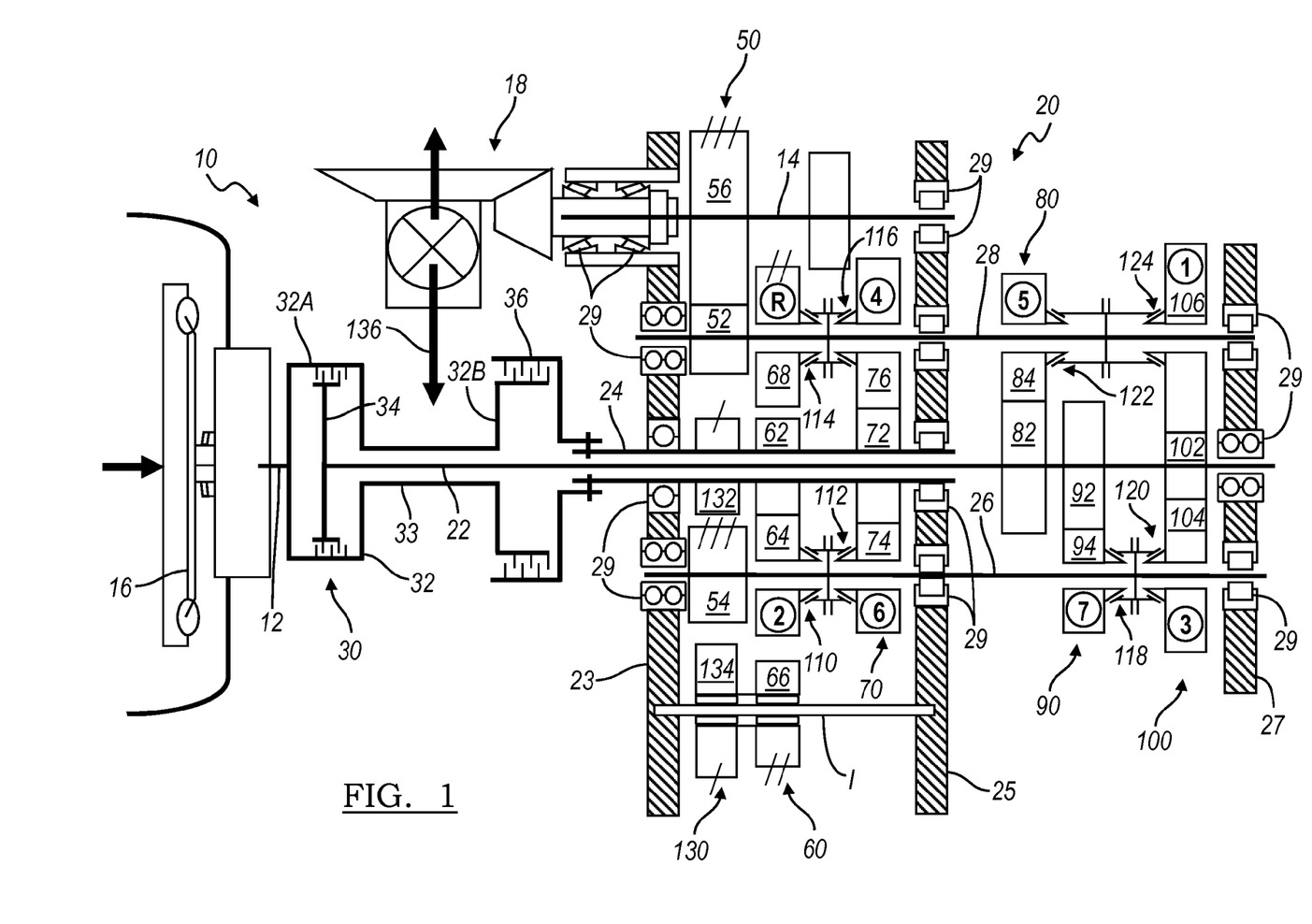
FIG. 1 is a schematic representation of a cross-section of a transmission of a first embodiment of a transmission in accordance with the invention.

Referring to the drawings, wherein like reference numbers refer to like components, in FIG. 1 a multi-speed transmission 10 is depicted. The transmission 10 includes an input member 12 and output member 14. In the present embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The transmission 10 includes a countershaft gearing arrangement 20 that includes intermediate shafts, countershafts, co-planar intermeshing gear sets and selectively engagable synchronizers as will be described herein. For example, the countershaft gearing arrangement 20 includes a first intermediate shaft 22 and a second intermediate shaft 24, which is a sleeve shaft concentric with the first intermediate shaft 22. The countershaft gearing arrangement 20 further includes a first countershaft 26 and a second countershaft 28. The countershafts 26, 28 are both spaced from and parallel with the input shaft 12, the output shaft 14 and the intermediate shafts 22, 24.

The first and second intermediate shafts 22, 24, first and second countershafts 26, 28 and output shaft 14 are supported by a first, second and third support structure or wall 23, 25, 27 formed in the housing of transmission 10. As conventionally known, the walls 23, 25, 27 are fitted with bearings 29 for rotatably supporting the first and second intermediate shafts 22, 24, first and second countershafts 26, 28 and output shaft 14. Wall 23 is disposed closest to the torque converter 16 and the final drive unit 18. Wall 25 is disposed adjacent wall 23 and wall 27 is disposed adjacent wall 25.

A dual clutch 30 is connected between input shaft 12 and first and second intermediate shafts 22, 24. The dual clutch 31 includes a clutch housing 32 connected for common rotation with input shaft 12. Clutch housing 32 has a first clutch portion 32a and a second clutch portion 32b connected by a housing shaft 33. Housing shaft 33, for example, is a sleeve shaft that is concentric with first intermediate shaft 22 and may be welded or otherwise connected to first and second clutch portions 32a, 32b or integrally formed therewith. Housing shaft 33 allows first and second clutch portions 32a, 32b to be positioned remote from each other to provide packaging clearance for transverse extending shafts, drivelines and like elements coupled to final drive unit 18. Further, clutch 31 has a first and a second clutch elements or hubs 34 and 36. Clutch elements 34 and 36 together with housing 32 are configured to form a friction clutch, as well known in the art as a dual clutch. More specifically, clutch elements 34, 36 and clutch housing portions 32a, 32b have friction plates mounted thereon that interact to form a friction clutch. Further, clutch element 34 is connected for common rotation with first intermediate shaft 22 and clutch element 36 is connected for common rotation with second intermediate shaft 24. Thus, selective engagement of clutch element 34 with clutch housing portions 32a, 32b, connects the input shaft 12 for common rotation with first intermediate shaft 22 and selective engagement of clutch element 36 with clutch housing 32, connects the input shaft 12 for common rotation with second intermediate shaft 24.

The countershaft gearing arrangement 20 also includes co-planar, intermeshing gear sets 50, 60, 70, 80, 90 and 100. Co-planar gear set 50 is a transfer gear set that includes transfer gears 52, 54 and 56. Transfer gear 52 is connected for common rotation with countershaft 28 and intermeshes with transfer gear 56. Transfer gear 54 is connected for common rotation with countershaft 26 and intermeshes with transfer gear 56. Transfer gear 56 is connected for common rotation with output shaft 14. As shown in FIG. 1, gear set 50 is disposed adjacent wall 23 and transfers torque from the first and second countershafts 26, 28 to output shaft 14.

Gear set 60 includes co-planar intermeshing gears 62, 64, 66 and 68. Gear 62 is connected for common rotation with second intermediate shaft 24 and intermeshes with gear 64 and reverse idler gear 66. Gear 64 is selectively connectable with first countershaft 26. Idler gear 66 is rotatable about idler axis I and intermeshes with gear 68. Gear 68 is selectively connectable with second countershaft 28. As shown in FIG. 1, gear set 60 is disposed adjacent gear set 50 and provides second and reverse gear ratios. More specifically, gear 64 driven by gear 62 is configured to produce the second gear ratio and gear 68 driven by gear 66 is configured to produce the reverse gear ratio.

Gear set 70 includes co-planar, intermeshing gears 72, 74 and 76. Gear 72 is connected for common rotation with second intermediate shaft 24. Gear 72 intermeshes with gear 74, which is selectively connectable for common rotation with countershaft 26. Gear 72 also intermeshes with gear 76, which is selectively connectable for common rotation with countershaft 28. As shown in FIG. 1, gear set 70 is disposed adjacent gear set 60 and wall 25 and provides fourth and sixth gear ratios. More specifically, gear 74 driven by gear 72 is configured to produce the sixth gear ratio and gear 76 driven by gear 72 is configured to produce the fourth gear ratio.

Gear set 80 includes co-planar, intermeshing gears 82 and 84. Gear 82 is connected for common rotation with first intermediate shaft 22. Gear 82 intermeshes with gear 84. Gear 84 is selectively connectable for common rotation with the second countershaft 28. As shown in FIG. 1, gear set 80 is disposed adjacent wall 25 and provides a fifth gear ratio. More specifically, gear 84 driven by gear 82 is configured to produce the fifth gear ratio.

Gear set 90 includes co-planar, intermeshing gears 92 and 94. Gear 92 is connected for common rotation with first intermediate shaft 22. Gear 92 intermeshes with gear 94. Gear 94 is selectively connectable for common rotation with first countershaft 26. As shown in FIG. 1, gear set 90 is disposed adjacent gear set 80 and provides a seventh gear ratio. More specifically, gear 94 driven by gear 92 is configured to produce the seventh gear ratio.

Gear set 100 includes co-planar, intermeshing gears 102, 104 and 106. Gear 102 is connected for common rotation with first intermediate shaft 22. Gear 102 intermeshes with both gears 104 and 106. Gear 104 is selectively connectable for common rotation with the first countershaft 26. Gear 106 is selectively connectable for common rotation with the second countershaft 28. As shown in FIG. 1, gear set 100 is disposed adjacent gear set 90 and wall 27 and provides a first and a third gear ratio. More specifically, gear 104 driven by gear 102 is configured to produce the third gear ratio and gear 106 driven by gear 102 is configured to produce the first gear ratio.

Gear set 130 includes co-planar intermeshing gears 132 and 134. Gear 132 is connected for common rotation with second intermediate shaft 24 and intermeshes with idler gear 134. Idler gear 134 is rotatable about idler axis I and is rotationally fixed for common rotation with gear 66 to form a double plane idler gear. As shown in FIG. 1, gear set 130 is disposed adjacent wall 23 and provides the reverse gear ratio. More specifically, gears 134 and 66 driven by gear 132 in turn drive gear 68 to produce the reverse gear ratio.

The transmission 10 further includes a plurality of selectively engagable synchronizers 110, 112, 114, 116, 118, 120, 122 and 124. Synchronizers 110/112, 114/116, 118/120 and 122/124 are a left and right side of synchronizer assemblies, sharing a common synchronizer hub and sleeve. Synchronizer 110 is selectively engagable to connect gear 64 with first countershaft 26 for common rotation therewith. Synchronizer 112 is selectively engagable to connect gear 74 with first countershaft 26 for common rotation therewith. Synchronizer 114 is selectively engagable to connect gear 68 with second countershaft 28 for common rotation therewith. Synchronizer 116 is selectively engagable to connect gear 76 with second countershaft 28 for common rotation therewith. Synchronizer 118 is selectively engagable to connect gear 94 with first countershaft 26 for common rotation therewith. Synchronizer 120 is selectively engagable to connect gear 104 with first countershaft 26 for common rotation therewith. Synchronizer 122 is selectively engagable to connect gear 84 with second countershaft 28 for common rotation therewith. Synchronizer 124 is selectively engagable to connect gear 106 with second countershaft 28 for common rotation therewith.

The transmission 10 is capable of transmitting torque from the input shaft 12 to the output shaft 14 in at least seven forward torque ratios and one reverse torque ratio. Each of the forward torque ratios and the reverse torque ratio is attained by engagement of dual clutch 30 and one of the clutch elements 34, 36 and one or more of the synchronizers 110, 112, 114, 116, 118, 120, 122 and 124. Those skilled in the art will readily understand that a different speed ratio is associated with each torque ratio.

To establish the reverse torque ratio clutch element 36 of the dual clutch 30 and synchronizer 114 are engaged. By the engagement of clutch element 36 of the dual clutch 30, torque is transferred from the input shaft 12 through clutch housing 32 to the second intermediate shaft 24. Further, torque is transferred from the second intermediate shaft 24 through gear 132 to idler gears 134 and 66. Idler gear 66 transfers the torque to gear 68. Upon engagement of synchronizer 114, gear 68 transfers torque to second countershaft 28. Second countershaft 28 transfers the torque to gear 52. Gear 52 transfers torque to gear 56, which in turn transfers the torque to output shaft 14. Output shaft 14 transfers the torque to the final drive unit 18.

A first forward torque ratio ($1^{st}$ gear) is achieved by engaging clutch element 34 of the dual clutch 30 and synchronizer 124. By the engagement of clutch element 34 of the dual clutch 30, torque is transferred from input shaft 12 through clutch housing 32 to the first intermediate shaft 22. Further, torque is transferred from the first intermediate shaft 22 to gear 102. Gear 102 transfers the torque to gear 106. Upon engagement of synchronizer 124, gear 106 transfers torque to second countershaft 28. Countershaft 28 transfers the torque to gear 52. Gear 52 transfers torque to gear 56, which in turn transfers the torque to output shaft 14. Output shaft 14 transfers the torque to the final drive unit 18.

A subsequent forward torque ratio ($2^{nd}$ gear) is established by engagement of clutch element 36 of the dual clutch 30 and synchronizer 110. By the engagement of clutch element 36 of the dual clutch 30, torque is transferred from input shaft 12 through clutch housing 32 to the second intermediate shaft 24. Further, torque is transferred from the second intermediate shaft 24 to gear 62. Gear 62 transfers the torque to gear 64. Upon engagement of synchronizer 110, gear 64 transfers torque to first countershaft 26. First countershaft 26 transfers the torque to gear 54. Gear 54 transfers torque to gear 56, which in turn transfers the torque to output shaft 14. Output shaft 14 transfers the torque to the final drive unit 18.

The subsequent torque ratio ($3^{rd}$ gear) is established by engagement of clutch element 34 of the dual clutch 30 and synchronizer 120. By the engagement of clutch element 34 of the dual clutch 30, torque is transferred from input shaft 12 through clutch housing 32 to the first intermediate shaft 22. Further, torque is transferred from the first intermediate shaft 22 to gear 102. Gear 102 transfers the torque to gear 104. Upon engagement of synchronizer 120, gear 104 transfers torque to first countershaft 26. First countershaft 26 transfers the torque to gear 54. Gear 54 transfers torque to gear 56, which in turn transfers the torque to output shaft 14. Output shaft 14 transfers the torque to the final drive unit 18.

The next subsequent forward torque ratio ($4^{th}$ gear) is established by engagement of clutch element 36 of the dual clutch 30 and synchronizer 116. By the engagement of clutch element 36 of the dual clutch 30, torque is transferred from input shaft 12 through clutch housing 32 to the second intermediate shaft 24. Further, torque is transferred from the second intermediate shaft 24 to gear 72. Gear 72 transfers the torque to gear 76. Upon engagement of synchronizer 116, gear 76 transfers torque to second countershaft 28. Second countershaft 28 transfers the torque to gear 52. Gear 52 transfers torque to gear 56, which in turn transfers the torque to output shaft 14. Output shaft 14 transfers the torque to the final drive unit 18.

The subsequent torque ratio ($5^{th}$ gear) is established by engagement of clutch element 34 of the dual clutch 30 and synchronizer 122. By the engagement of clutch element 34 of the dual clutch 30, torque is transferred from input shaft 12 through clutch housing 32 to the first intermediate shaft 22. Further, torque is transferred from the first intermediate shaft 22 to gear 82. Gear 82 transfers the torque to gear 84. Upon engagement of synchronizer 122, gear 84 transfers torque to second countershaft 28. Second countershaft 28 transfers the torque to gear 52. Gear 52 transfers torque to gear 56, which in turn transfers the torque to output shaft 14. Output shaft 14 transfers the torque to the final drive unit 18.

A subsequent forward torque ratio ($6^{th}$ gear) is established by engagement of clutch element 36 of the dual clutch 30 and synchronizer 112. By the engagement of clutch element 36 of the dual clutch 30, torque is transferred from input shaft 12 through clutch housing 32 to the second intermediate shaft 24. Further, torque is transferred from the second intermediate shaft 24 to gear 72. Gear 72 transfers the torque to gear 74. Upon engagement of synchronizer 112, gear 74 transfers torque to first countershaft 26. First countershaft 26 transfers the torque to gear 54. Gear 54 transfers torque to gear 56, which in turn transfers the torque to output shaft 14. Output shaft 14 transfers the torque to the final drive unit 18.

The subsequent torque ratio ($7^{th}$ gear) is established by engagement of clutch element 34 of the dual clutch 30 and synchronizer 118. By the engagement of clutch element 34 of the dual clutch 30, torque is transferred from input shaft 12 through clutch housing 32 to the first intermediate shaft 22. Further, torque is transferred from the first intermediate shaft 22 to gear 92. Gear 92 transfers the torque to gear 94. Upon engagement of synchronizer 118, gear 94 transfers torque to first countershaft 26. First countershaft 26 transfers the torque to gear 54. Gear 54 transfers torque to gear 56, which in turn transfers the torque to output shaft 14. Output shaft 14 transfers the torque to the final drive unit 18.

The present invention contemplates that a variety of torque ratios (i.e., the ratio of torque of the output member 14 to the input member 12) are achievable through the selection of tooth counts of the gears of the transmission 10. Gear ratio flexibility is provided in the selection of gear ratios with respect to 5th gear and $7^{th}$ gear, as the gears (82, 84 and 92, 94) that provide these ratios are disposed in two separate planes. Further, a single pinion gear 82 is used to provide the $5^{th}$ gear and a separate single pinion gear 92 is used to provide the $7^{th}$ gear. Further, the reverse gear ratio flexibility is achieved by utilizing a double plane reverse idler. Moreover, the present invention advantageously provides the transfer gears 52, 54 in one plane. This arrangement provides the opportunity to achieve the desired transmission length reduction.

Second Embodiment

Figure 2:
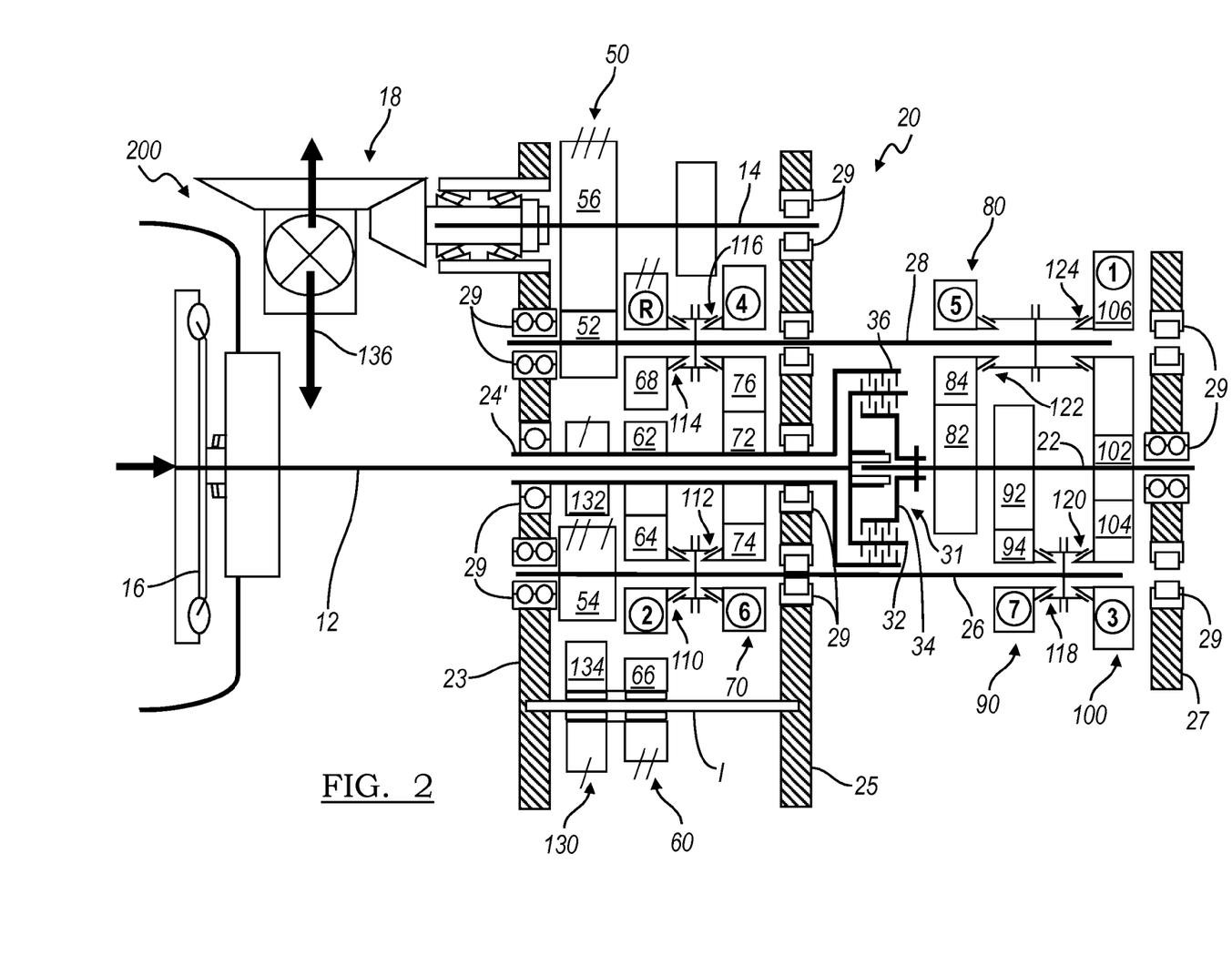
FIG. 2 is a schematic representation of a cross-section of a transmission of a second embodiment of a transmission in accordance with the invention.

Referring to FIG. 2, a multi-speed transmission 200 is depicted. The transmission 200 includes input member 12 and output member 14 as described in the first embodiment. The input shaft 12 is continuously connected with the torque converter 16 or other starting device. An engine (not shown) is connected to and provides the driving torque to the torque converter 16. The output shaft 14 is continuously connected with the final drive unit 18, as described previously with respect to the first embodiment.

Moreover, transmission 200 includes the same countershaft gearing arrangement 20 that includes intermediate shafts, countershafts, co-planar intermeshing gear sets and selectively engagable synchronizers as described above with respect to the first embodiment.

Further transmission 200, as with the first embodiment, has first and second intermediate shafts 22, 24', first and second countershafts 26, 28 and output shaft 14 supported by first, second and third support structures or walls 23, 25, 27 formed in the housing of transmission 200. Wall 23 is disposed closest to the torque converter 16 and the final drive unit 18. Wall 25 is disposed adjacent wall 23 and wall 27 is disposed adjacent wall 25.

However, transmission 200 has a dual clutch 31 that disposed adjacent wall 25 and gear set 80. Dual clutch 31 is connected between input shaft 12 and first and second intermediate shafts 22, 24'. Second intermediate shaft 24', in the present embodiment, is a sleeve shaft concentric with and disposed over input shaft 12. The dual clutch 30 includes a clutch housing 32 connected for common rotation with input shaft 12. Further, clutch 30 has first and second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further, clutch element 34 is connected for common rotation with first intermediate shaft 22 and clutch element 36 is connected for common rotation with second intermediate shaft 24'. Thus, selective engagement of clutch element 34 with clutch housing 32, connects the input shaft 12 for common rotation with first intermediate shaft 22 and selective engagement of clutch element 36 with clutch housing 32, connects the input shaft 12 for common rotation with second intermediate shaft 24'. Moreover, clutch element 36 is disposed radially outward of clutch housing 32 and clutch element 34 is disposed radially inward of clutch housing 32. The radial positioning of clutch elements 34 and 36 provides a significant transmission axial length reduction. Further the axial positioning of dual clutch 31 between wall 25 and gear set 80 provides a further reduction in the axial length of the transmission.

As in the first embodiment, countershaft gearing arrangement 20 also includes co-planar, intermeshing gear sets 50, 60, 70, 80, 90 and 100 and a co-planar idler gear set 130. Further, the transmission 200 includes the same plurality of selectively engagable synchronizers 110, 112, 114, 116, 118, 120, 122 and 124 for selectively engaging the same gears as described above with respect to the first embodiment.

Transmission 200 is capable of transmitting torque from the input shaft 12 to the output shaft 14 in at least seven forward torque ratios and one reverse torque ratio, as indicated in FIG. 2. Each of the forward torque ratios and the reverse torque ratio is attained by engagement of dual clutch 31 and one of the clutch elements 34, 36 and one or more of the synchronizers 110, 112, 114, 116, 118, 120, 122 and 124. Those skilled in the art will readily understand that a different speed ratio is associated with each torque ratio and how these torque ratios are achieved, based on the description of transmission 10.

Third Embodiment

Figure 3:
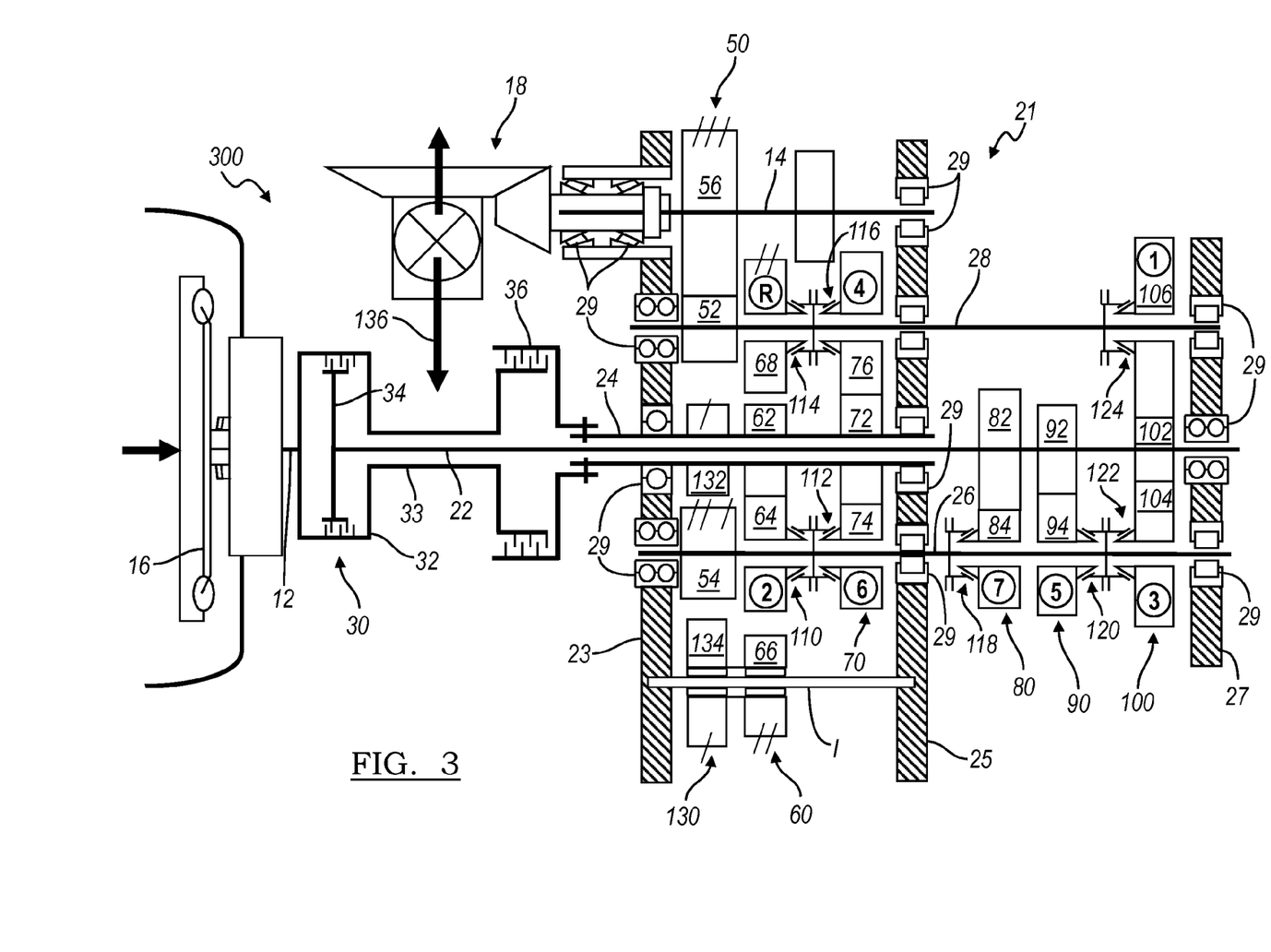
FIG. 3 is a schematic representation of a cross-section of a transmission of a third embodiment of a transmission in accordance with the invention.

Referring to FIG. 3 a multi-speed transmission 300 is depicted. The transmission 300 includes input member 12 and output member 14 as described in the first embodiment. The input shaft 12 is continuously connected with the torque converter 16 or other starting device. An engine (not shown) is connected to and provides the driving torque to the torque converter 16. The output shaft 14 is continuously connected with the final drive unit 18, as described previously with respect to the first embodiment.

Moreover, transmission 300 includes a countershaft gearing arrangement 21. Countershaft gearing arrangement 21 includes intermediate shafts, countershafts, co-planar intermeshing gear sets and selectively engagable synchronizers and is the same in all respects to countershaft gearing arrangement 20 as described above with respect to the first embodiment, with the exception of the placement, connection and gear ratios provided by gear sets 80 and 90. More specifically, in the present embodiment, gear set 80 includes gears 82 and 84 and gear set 90 includes gears 92 and 94. Gears 82 and 92 are connected for common rotation with first intermediate shaft 22 and intermesh with gears 84 and 94, respectively. Gears 84 and 94 are selectively connectable for common rotation with the first countershaft 26. The gear arrangement and positioning of gear sets 80 and 90 allows for a decreased center distance between countershaft 28 and intermediate shafts 22 and 24.

Upon engagement of synchronizer 118, gear 84 transfers torque from gear 82 to first counter shaft 26 to provide a seventh gear ratio. First countershaft 26 transfers torque to transfer gear 54. Transfer gear 54 transfers the torque to transfer gear 56. Transfer gear 56 transfers the torque to output shaft 14. Upon engagement of synchronizer 120, gear 94 transfers torque from gear 92 to first countershaft 26 to provide a fifth gear ratio. First countershaft 26 transfers torque to transfer gear 54. Transfer gear 54 transfers the torque to transfer gear 56. Transfer gear 56 transfers the torque to output shaft 14.

Further transmission 300, as with the first embodiment, has first and second intermediate shafts 22, 24, first and second countershafts 26, 28 and output shaft 14 supported by first, second and third support structures or walls 23, 25, 27 formed in the housing of transmission 300. Wall 23 is disposed closest to the torque converter 16 and the final drive unit 18. Wall 25 is disposed adjacent wall 23 and wall 27 is disposed adjacent wall 25.

The dual clutch 30 described above with respect to the first embodiment and FIG. 1 is provided in transmission 300. Moreover, the connections of clutch elements 34 and 36 to first intermediate shaft 22 and second intermediate shaft 24 are as described above with respect to the first embodiment shown in FIG. 1. The mode of operation of dual clutch 30 is as described above with respect to the first embodiment shown in FIG. 1.

The transmission 300 is capable of transmitting torque from the input shaft 12 to the output shaft 14 in at least seven forward torque ratios and one reverse torque ratio, as indicated in FIG. 3. Each of the forward torque ratios and the reverse torque ratio is attained by engagement of dual clutch 30 and one of the clutch elements 34, 36 and one or more of the synchronizers 110, 112, 114, 116, 118, 120, 122 and 124. Those skilled in the art will readily understand that a different speed ratio is associated with each torque ratio and how these torque ratios are achieved, based on the above description of transmission 10.

Fourth Embodiment

Figure 4:
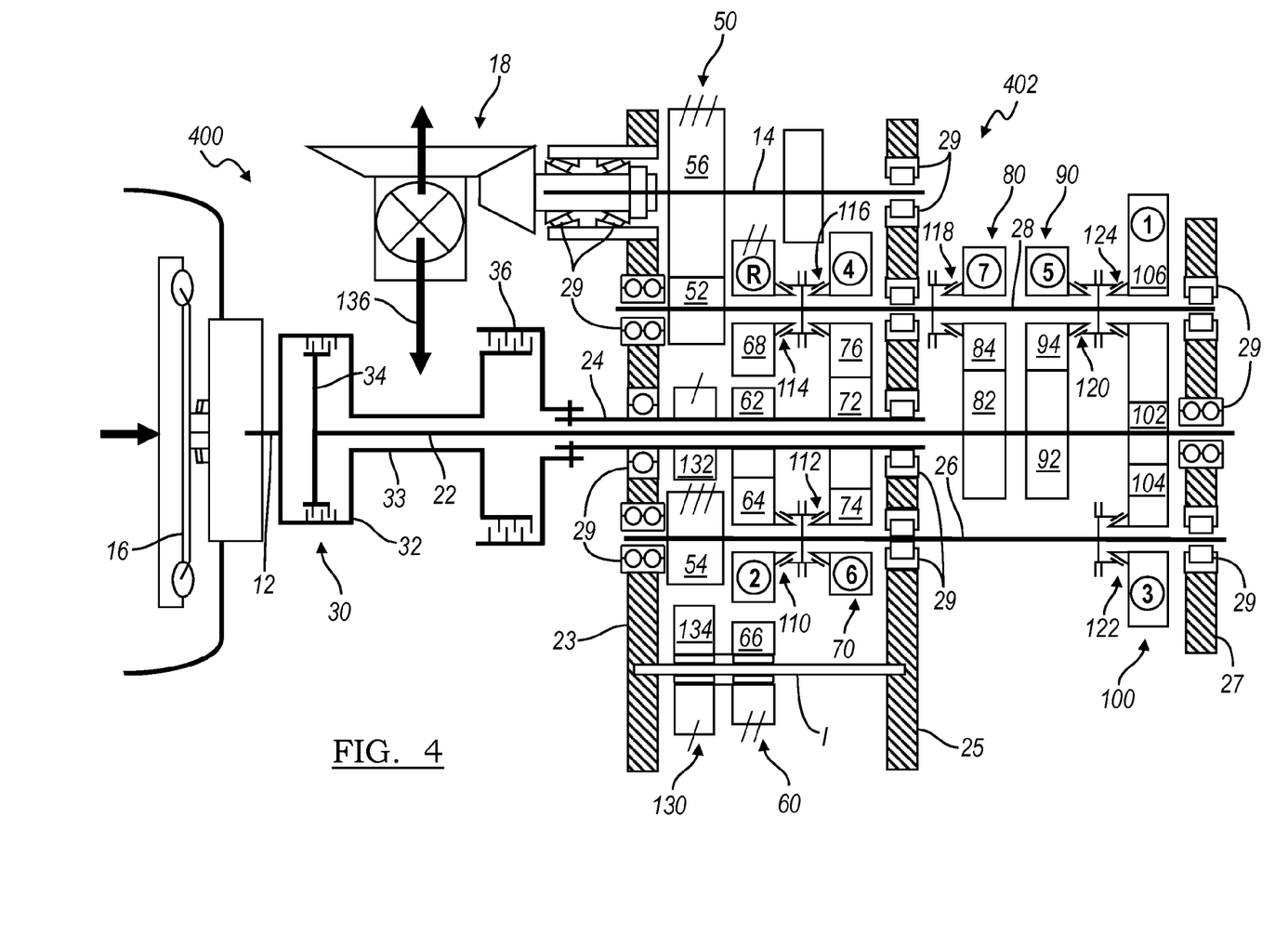
FIG. 4 is a schematic representation of a cross-section of a transmission of a fourth embodiment of a transmission in accordance with the invention.

Referring to FIG. 4 a multi-speed transmission 400 is depicted. The transmission 400 includes input member 12 and output member 14 as described in the first embodiment. The input shaft 12 is continuously connected with the torque converter 16 or other starting device. An engine (not shown) is connected to and provides the driving torque to the torque converter 16. The output shaft 14 is continuously connected with the final drive unit 18, as described previously with respect to the first embodiment.

Moreover, transmission 400 includes a countershaft gearing arrangement 402. Countershaft gearing arrangement 402 includes intermediate shafts, countershafts, co-planar intermeshing gear sets and selectively engagable synchronizers and is the same in all respects to countershaft gearing arrangement 21 as described above with respect to the third embodiment, with the exception of the placement and connection of gear sets 80 and 90. More specifically, in the present embodiment, gear set 80 includes gears 82 and 84 and gear set 90 includes gears 92 and 94. Gears 82 and 92 are connected for common rotation with first intermediate shaft 22 and intermesh with gears 84 and 94, respectively. Gears 84 and 94 are selectively connectable for common rotation with the second countershaft 28. The gear arrangement and positioning of gear sets 80 and 90 allows for a decreased center distance between countershaft 26 and intermediate shafts 22 and 24.

Upon engagement of synchronizer 118, gear 84 transfers torque from gear 82 to second countershaft 28 to provide a seventh gear ratio. Second countershaft 28 transfers torque to transfer gear 52. Transfer gear 52 transfers the torque to transfer gear 56. Transfer gear 56 transfers the torque to output shaft 14. Upon engagement of synchronizer 120, gear 94 transfers torque from gear 92 to second countershaft 28 to provide a fifth gear ratio. Second countershaft 28 transfers torque to transfer gear 52. Transfer gear 52 transfers the torque to transfer gear 56. Transfer gear 56 transfers the torque to output shaft 14.

Further, transmission 400, as with the third embodiment, has first and second intermediate shafts 22, 24, first and second countershafts 26, 28 and output shaft 14 supported by first, second and third support structures or walls 23, 25, 27 formed in the housing of transmission 400. Wall 23 is disposed closest to the torque converter 16 and the final drive unit 18. Wall 25 is disposed adjacent wall 23 and wall 27 is disposed adjacent wall 25.

The dual clutch 30 described above with respect to the first embodiment and shown in FIG. 1 is provided in transmission 400. Moreover, the connections of clutch elements 34 and 36 to first intermediate shaft 22 and second intermediate shaft 24 are as described above with respect to the first embodiment shown in FIG. 1. The mode of operation of dual clutch 30 is as described above with respect to the first embodiment shown in FIG. 1.

The transmission 400 is capable of transmitting torque from the input shaft 12 to the output shaft 14 in at least seven forward torque ratios and one reverse torque ratio, as indicated in FIG. 4. Each of the forward torque ratios and the reverse torque ratio is attained by engagement of dual clutch 30 and one of the clutch elements 34, 36 and one or more of the synchronizers 110, 112, 114, 116, 118, 120, 122 and 124. Those skilled in the art will readily understand that a different speed ratio is associated with each torque ratio and how these torque ratios are achieved, based on the above description of transmission 10.

Fifth Embodiment

Figure 5:
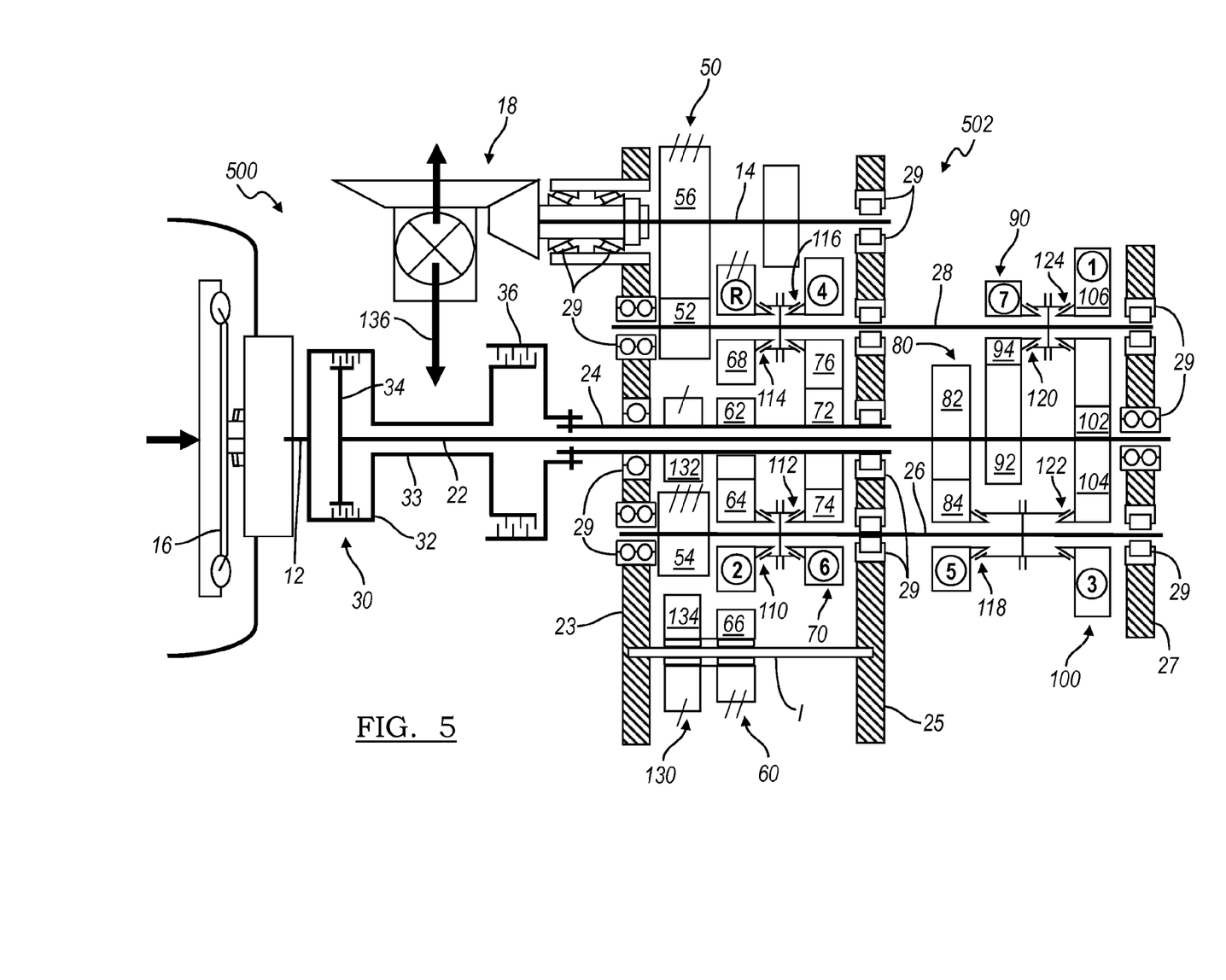
FIG. 5 is a schematic representation of a cross-section of a transmission of a fifth embodiment of a transmission in accordance with the invention.

Referring now to FIG. 5, a multi-speed transmission 500 is depicted. The transmission 500 includes input member 12 and output member 14 as described in the first embodiment. The input shaft 12 is continuously connected with the torque converter 16 or other starting device. An engine (not shown) is connected to and provides the driving torque to the torque converter 16. The output shaft 14 is continuously connected with the final drive unit 18, as described previously with respect to the first embodiment.

Moreover, transmission 500 includes a countershaft gearing arrangement 502. Countershaft gearing arrangement 502 includes intermediate shafts, countershafts, co-planar intermeshing gear sets and selectively engagable synchronizers and is the same in all respects to countershaft gearing arrangement 402 as described above with respect to the fourth embodiment, with the exception of the placement and connection of gear sets 80 and 90. More specifically, in the present embodiment, gear set 80 includes gears 82 and 84 and gear set 90 includes gears 92 and 94. Gears 82 and 92 are connected for common rotation with first intermediate shaft 22 and intermesh with gears 84 and 94, respectively. Gear 84 is selectively connectable for common rotation with the first countershaft 26 and gear 94 is selectively connectable for common rotation with the second countershaft 28. The gear arrangement and positioning of gear sets 80 and 90 allows for the gear ratios and gear step changes desired to match the particular application requirements.

Upon engagement of synchronizer 118, gear 84 transfers torque from gear 82 to first countershaft 26 to provide a fifth gear ratio. First countershaft 26 transfers torque to transfer gear 54. Transfer gear 54 transfers the torque to transfer gear 56. Transfer gear 56 transfers the torque to output shaft 14. Upon engagement of synchronizer 120, gear 94 transfers torque from gear 92 to second countershaft 28 to provide a seventh gear ratio. Second countershaft 28 transfers torque to transfer gear 52. Transfer gear 52 transfers the torque to transfer gear 56. Transfer gear 56 transfers the torque to output shaft 14.

Further, transmission 500, as with the fourth embodiment, has first and second intermediate shafts 22, 24, first and second countershafts 26, 28 and output shaft 14 supported by first, second and third support structures or walls 23, 25, 27 formed in the housing of transmission 500. Wall 23 is disposed closest to the torque converter 16 and the final drive unit 18. Wall 25 is disposed adjacent wall 23 and wall 27 is disposed adjacent wall 25.

The dual clutch 30 described above with respect to the first embodiment and shown in FIG. 1 is provided in transmission 500. Moreover, the connections of clutch elements 34 and 36 to first intermediate shaft 22 and second intermediate shaft 24 are as described above with respect to the first embodiment shown in FIG. 1. The mode of operation of dual clutch 30 is as described above with respect to the first embodiment shown in FIG. 1.

The transmission 500 is capable of transmitting torque from the input shaft 12 to the output shaft 14 in at least seven forward torque ratios and one reverse torque ratio, as indicated in FIG. 5. Each of the forward torque ratios and the reverse torque ratio is attained by engagement of dual clutch 30 and one of the clutch elements 34, 36 and one or more of the synchronizers 110, 112, 114, 116, 118, 120, 122 and 124. Those skilled in the art will readily understand that a different speed ratio is associated with each torque ratio and how these torque ratios are achieved, based on the above description of transmission 10.

Accordingly, the present embodiments of the invention have many advantages and benefits over the prior art. For example, the transmission of the present invention provides the final drive unit 18 with a final drive unit output shaft 136. Moreover, the final drive unit output shaft 136 is transverse or perpendicular to input member 12. In embodiments of the present invention, final drive unit output shaft 136 is disposed between the clutch elements or hubs 34 and 36 of clutch 30.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
   a transmission input member;
   a power source for generating a torque in the input member;
   a first intermediate shaft;
   a second intermediate shaft;
   a clutch selectively engagable to couple the transmission input member with one of the first and second intermediate shafts;
   a first and a second countershaft;
   a transmission housing having a front and rear wall for supporting the first and second intermediate shaft and the first and second countershaft;
   a first set of gears connected for common rotation with the first intermediate shaft and intermeshing with a first selectable set of gears to form a first plurality of co-planar gear sets, wherein each of the gears of the first selectable set of gears is connectable for common rotation with one of the first and second countershafts for selectively transferring the torque to the countershafts when the clutch is engaged;
   a second set of gears connected for common rotation with the second intermediate shaft and intermeshing with a second selectable set of gears to form a second plurality of co-planar gear sets, wherein each of the gears of the second selectable set of gears is connectable for common rotation with one of the first and second countershafts for selectively transferring the torque to one of the countershafts when the clutch is engaged;
   an output shaft disposed radially outward of the second intermediate shaft; and
   a first transfer gear coupled to one of the first and second countershafts for transferring torque from the first and second countershaft to the output shaft, and
   wherein one of the second plurality of co-planar gear sets that produces a first and third gear ratio is adjacent the rear wall of the transmission housing.

2. The powertrain of claim 1, wherein the first set of gears further comprises two gears.

3. The powertrain of claim 1, wherein the second set of gears further comprises three gears.

4. The powertrain of claim 1, further comprising a first idler gear rotatable about a first idler axis and intermeshing with at least one of the selectable sets of gears of the first set of gears.

5. The powertrain of claim 4, further comprising a second idler gear rotatable about the idler axis and intermeshing with the first transfer gear.

6. The powertrain of claim 1, further comprising a second transfer gear connected for common rotation with one of the first and second countershafts and intermeshing with an output gear connected for common rotation with the output shaft for transferring torque from the countershaft to the output shaft.

7. The powertrain of claim 6, wherein the first and second transfer gears are disposed in a single plane.

8. The powertrain of claim 1, further comprising a plurality of synchronizers for selectively connecting the first and second set of selectable sets of gears to at least one of the countershafts.

9. The powertrain of claim 1, further comprising eight synchronizers for selectively connecting the first and second set of selectable sets of gears to at least one of the countershafts.

10. The powertrain of claim 1, further comprising a final drive unit wherein the final drive unit has an output shaft that is perpendicular to the input member.

11. The powertrain of claim 1, wherein the clutch is a dual clutch having a first hub connected to the first intermediate shaft and a second hub connected to the second intermediate shaft.

12. The powertrain of claim 11, wherein the first hub is remote from the second hub and wherein an output shaft of the final drive unit that is perpendicular to the input member is disposed between the first and second hub.

13. The powertrain of claim 1, wherein the clutch is disposed between the first and second plurality of co-planar gear sets.

14. The powertrain of claim 1, wherein the clutch is a friction clutch.

15. The powertrain of claim 1, wherein a first plurality of co-planar gear sets further comprises two co-planar gear sets.

16. The powertrain of claim 1, wherein a second plurality of co-planar gear sets further comprises three co-planar gear sets.

17. The powertrain of claim 1, wherein one of the second plurality of co-planar gear sets transfers the torque to achieve a fifth forward gear ratio.

18. The powertrain of claim 17, wherein the one of the second plurality of co-planar gear sets that transfers the torque to achieve the fifth forward gear ratio is disposed adjacent a structural wall of the housing of the powertrain.

19. The powertrain of claim 17, wherein the one of the second plurality of co-planar gear sets that achieves the fifth forward gear ratio includes a single drive gear and a single driven gear.

20. The powertrain of claim 1, wherein one of the second plurality of co-planar gear sets transfers the torque to achieve a seventh forward gear ratio.

21. The powertrain of claim 20, wherein the one of the second plurality of co-planar gear sets that achieves the seventh forward gear ratio includes a single drive gear and a single driven gear.

22. The powertrain of claim 21, wherein the one of the second plurality of co-planar gear sets that transfers the torque to achieve the seventh forward gear ratio is disposed adjacent a structural wall of the housing of the powertrain.

23. The powertrain of claim 1 wherein a first of the first plurality of co-planar gear sets include a first selectable gear and a first gear intermeshed with a second selectable gear, and wherein a second of the first plurality of co-planar gear sets include a first gear intermeshed with a first selectable gear and a second selectable gear, wherein the first gears are coupled to the first intermediate shaft, the first selectable gears are selectively connectable to the first countershaft, and the second selectable gears are selectively connectable to the second countershaft.

24. The powertrain of claim 23 wherein the first selectable gears of the first and second co-planar gear sets are selectively connectable to the first countershaft by a first synchronizer assembly having a pair of synchronizers and the second selectable gears of the first and second co-planar gear sets are selectively connectable to the second countershaft by a second synchronizer assembly having a pair of synchronizers.

25. The powertrain of claim 24 wherein the first co-planar gear set includes a reverse gear rotatable about an idler axis, and wherein the reverse gear is intermeshed with the first selectable gear of the first co-planar gear set in order to provide a reverse gear ratio.

26. The powertrain of claim 25 further comprising a reverse transfer gear rotatable about the idler axis and connected for common rotation with the reverse gear, the reverse transfer gear intermeshed with the first transfer gear.

27. The powertrain of claim 26 wherein a third of the second plurality of co-planar gear sets include a first gear intermeshed with a first selectable gear and a second selectable gear, wherein the first gear is coupled to the second intermediate shaft, the first selectable gear is selectively connectable to the first countershaft, and the second selectable gear is selectively connectable to the second countershaft.

28. The powertrain of claim 27 wherein a fourth and a fifth of the second plurality of co-planar gear sets each include a first gear intermeshed with a first selectable gear, wherein the first gears are coupled to the second intermediate shaft and the first selectable gears are selectively connectable to at least one of the first and second countershafts.

29. The powertrain of claim 28 wherein the first selectable gear of the fourth co-planar gear set is selectively connectable to the first countershaft and the first selectable gear of the fifth co-planar gear set is selectively connectable to the second countershaft.

30. The powertrain of claim 29 wherein the first selectable gears of the third and fourth co-planar gear sets are selectively connectable to the first countershaft by a third synchronizer assembly having a pair of synchronizers and the second selectable gear of the third co-planar gear set and the first selectable gear of the fifth co-planar gear set are selectively connectable to the second countershaft by a fourth synchronizer assembly having a pair of synchronizers.

31. The powertrain of claim 28 wherein the first selectable gear of the fourth co-planar gear set is selectively connectable to the second countershaft and the first selectable gear of the fifth co-planar gear set is selectively connectable to the second countershaft.

32. The powertrain of claim 31 wherein the first selectable gear of the third co-planar gear set is selectively connectable to the first countershaft by a third synchronizer assembly having a single synchronizer, the second selectable gear of the third co-planar gear set and the first selectable gear of the fourth co-planar gear set are selectively connectable to the second countershaft by a fourth synchronizer assembly having a pair of synchronizers, and the first selectable gear of the fifth co-planar gear set is selectively connectable to the second countershaft by a fifth synchronizer assembly having a single synchronizer.

33. The powertrain of claim 28 wherein the first selectable gear of the fourth co-planar gear set is selectively connectable to the first countershaft and the first selectable gear of the fifth co-planar gear set is selectively connectable to the first countershaft.

34. The powertrain of claim 33 wherein the second selectable gear of the third co-planar gear set is selectively connectable to the second countershaft by a third synchronizer assembly having a single synchronizer, the first selectable gear of the third co-planar gear set and the first selectable gear of the fourth co-planar gear set are selectively connectable to the first countershaft by a fourth synchronizer assembly having a pair of synchronizers, and the first selectable gear of the fifth co-planar gear set is selectively connectable to the first countershaft by a fifth synchronizer assembly having a single synchronizer.

* * * * *